US007971884B2

(12) United States Patent
Lundh

(10) Patent No.: US 7,971,884 B2
(45) Date of Patent: Jul. 5, 2011

(54) STANDING BOARD FOR CHILDREN

(76) Inventor: Joran Lundh, Hong Kong (HK)

( * ) Notice: Subject to any disclaimer, the term of this patent is extended or adjusted under 35 U.S.C. 154(b) by 358 days.

(21) Appl. No.: 12/063,013

(22) PCT Filed: Aug. 31, 2006

(86) PCT No.: PCT/SE2006/000997
§ 371 (c)(1),
(2), (4) Date: Feb. 5, 2008

(87) PCT Pub. No.: WO2007/030054
PCT Pub. Date: Mar. 15, 2007

(65) Prior Publication Data
US 2008/0224432 A1 Sep. 18, 2008

(30) Foreign Application Priority Data

Sep. 5, 2005 (SE) ........................................ 0501969

(51) Int. Cl.
*B62D 63/00* (2006.01)
(52) U.S. Cl. ..................................... 280/32.7; 280/47.38
(58) Field of Classification Search ............. 280/2, 32.7, 280/63, 75, 76, 77, 304.1, 656, 769, 47.38, 280/62, 650; 172/433; 296/97.21
See application file for complete search history.

(56) References Cited

U.S. PATENT DOCUMENTS

| 3,368,827 A | * | 2/1968 | Dashew | 280/401 |
| 4,190,280 A | * | 2/1980 | Donohoe | 296/20 |
| 5,562,136 A | * | 10/1996 | Blackshear | 144/144.1 |
| 5,564,786 A | * | 10/1996 | Peek et al. | 297/452.4 |
| 5,577,744 A | * | 11/1996 | Parks | 280/32.6 |
| 5,813,582 A | * | 9/1998 | Wright | 224/407 |
| 6,422,634 B2 | * | 7/2002 | Lundh | 296/97.21 |
| 6,485,036 B1 | * | 11/2002 | Bricko | 280/32.7 |
| 6,488,291 B1 | * | 12/2002 | Bellis, Jr. | 280/32.7 |

(Continued)

FOREIGN PATENT DOCUMENTS

DE 20213848 12/2002

(Continued)

OTHER PUBLICATIONS

Supplementary European Search Report from corresponding International Application No. PCT/SE2006000997, mailed Jul. 28, 2008.

(Continued)

*Primary Examiner* — Jeffrey J Restifo
*Assistant Examiner* — Brodie Follman
(74) *Attorney, Agent, or Firm* — Polster, Lieder, Woodruff & Lucchesi, L.C.

(57) ABSTRACT

This invention is a Standing board for prams, which is fastened to a pram with fastening beams that protrude from the Standing board and that have means for fastening to the pram on their outer ends. The fastening beams (4, 5) point forward in the Standing board's normal direction of movement and are basically parallel with it. They are also adjustable in a right angle to the movement direction, mounted on the forward edge of the Standing board with their fastenings (8, 9), which have means for retaining the fastenings in their adjusted position on the Standing board (1). The fastening beams are mounted in a manner that allows them to be twisted in the fastenings for adjustment of their angle relative to the supporting area.

13 Claims, 2 Drawing Sheets

U.S. PATENT DOCUMENTS

| | | | |
|---|---|---|---|
| 6,497,422 B1 * | 12/2002 | Bellis, Jr. | 280/32.7 |
| 6,575,480 B2 * | 6/2003 | McKelvey | 280/33.993 |
| 6,827,356 B2 * | 12/2004 | Zhuang | 280/32.7 |
| 7,581,737 B2 * | 9/2009 | Cousin | 280/63 |
| 7,641,217 B2 * | 1/2010 | Yoo et al. | 280/646 |
| 2001/0004158 A1 * | 6/2001 | Lundh | 296/97.21 |
| 2004/0164510 A1 * | 8/2004 | Zhuang | 280/63 |
| 2005/0156396 A1 * | 7/2005 | Teng et al. | 280/87.041 |
| 2006/0290081 A1 * | 12/2006 | Baum | 280/32.7 |
| 2007/0018418 A1 * | 1/2007 | Huang | 280/124.111 |
| 2007/0090619 A1 * | 4/2007 | Lundh | 280/63 |
| 2007/0114738 A1 * | 5/2007 | Jones et al. | 280/32.7 |
| 2008/0001370 A1 * | 1/2008 | Cousin | 280/32.7 |
| 2008/0088115 A1 * | 4/2008 | Yang et al. | 280/642 |
| 2008/0224432 A1 * | 9/2008 | Lundh | 280/47.38 |
| 2009/0194968 A1 * | 8/2009 | Ardagna | 280/460.1 |
| 2009/0309330 A1 * | 12/2009 | Ryan | 280/462 |

FOREIGN PATENT DOCUMENTS

| | | | |
|---|---|---|---|
| DE | 20213848 U | | 12/2002 |
| DE | 20306242 | | 8/2003 |
| EP | 1550596 | | 7/2005 |
| GB | 2328907 A | | 10/1999 |
| JP | 3096255 U | | 9/2003 |
| JP | 2009056988 A | * | 3/2009 |
| WO | 2005/039954 | | 5/2005 |

OTHER PUBLICATIONS

International Search Report from corresponding International Application No. PCT/SE2006/000997 mailed Dec. 4, 2006.

\* cited by examiner

STANDING BOARD FOR CHILDREN

CROSS-REFERENCE TO RELATED APPLICATIONS

This application is the US National Phase under 35 USC §371 of International Application No. PCT/SE2006/000997 having an international filing date of Aug. 31, 2006 and which claims priority to Swedish Application No. 0501969-0 filed Sep. 5, 2005.

BACKGROUND OF THE INVENTION

This invention relates to a standing board for children's strollers, which can be used in connection with most current stroller designs.

Standing boards are used for strollers primarily to make it possible for an additional child to be transported with the stroller. In addition a standing board can be used for the transport of goods. The standing board is fixed to the stroller with beams that reach from the standing board to suitable fastening points on the stroller. In order to facilitate connection to as many types of stroller on the market as possible, the beams are adjustable to fit the fastening points. The present invention is a standing board of this adjustable type.

The purpose of the present invention is to facilitate a simple adjustment of the fastening beams so the standing board can be utilised for a large variety of stroller designs. According to the invention, this is achieved with a standing board that is fastened to the stroller with fastening beams that reach from the standing board and has a means for fastening to the stroller on the far end of the beams. The fastening beams are aligned in the direction of the standing board's normal direction of movement and are basically parallel to the standing board itself and are adjustable in a right angle to the movement direction. It is also mounted on the forward edge of the standing board with devices to maintain the beams in their set positions. The fastening beams can be adjusted along the forward edge of the standing board, i.e. across the preconceived movement direction of the standing board. The angle of the fastening beams related to the standing board is fixed and depends only on the angle of the front of the standing board in relation to the supporting surface to be used for transport. In order to facilitate adjustment to different stroller designs the fastening beams are designed to be able to be twisted in the fastening points for adjustment of their angle against the supporting surface of the standing board.

The particularities of the invention are described in the patent claims.

DESCRIPTION OF THE DRAWINGS

The following is a detailed description of the invention with references to the included illustrations, which shows an example of its design.

DETAILED DESCRIPTION

Figure 1:
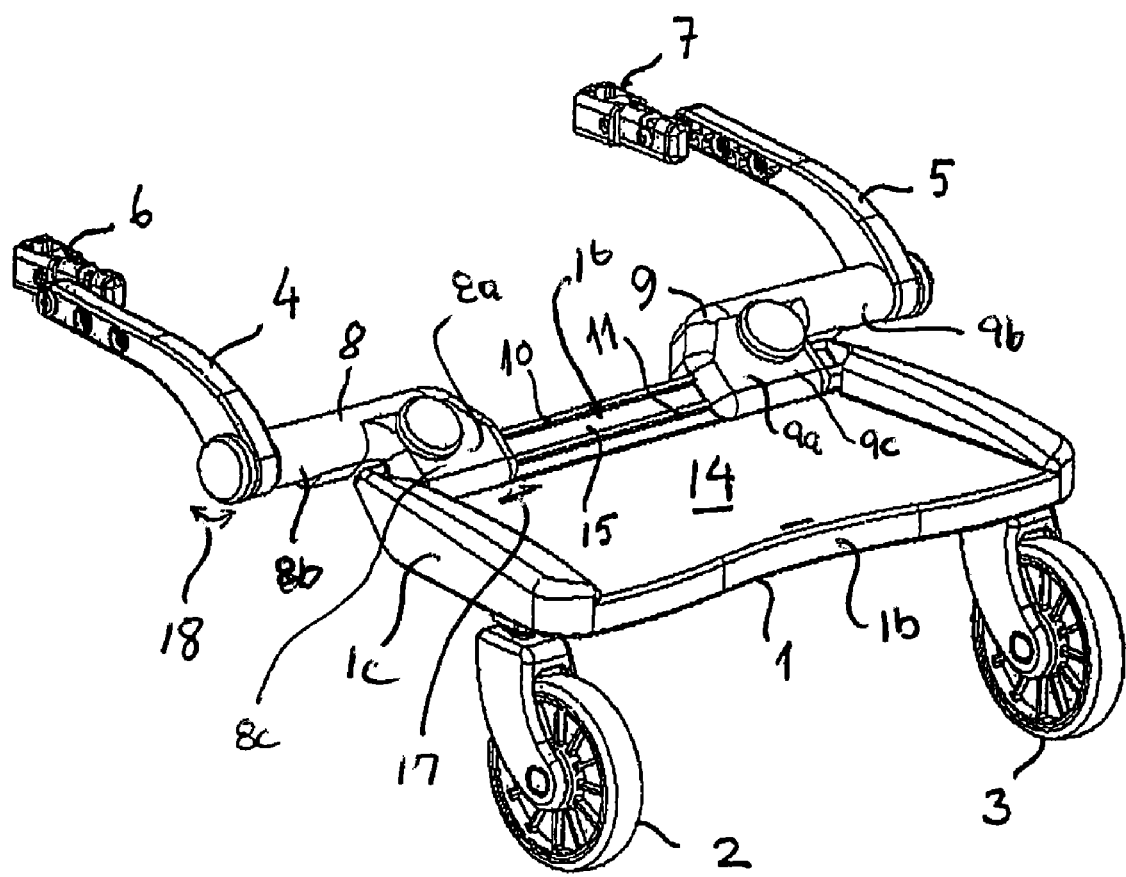
FIG. 1 shows a standing board according to the invention described above.

The standing board has a supporting board or area 1 with a supporting surface 14 for the child or the goods to be transported. The standing board 1 has a front edge 1a, a back edge 1b and side edges 1c. Under the board are two wheels 2, 3, which can rotate around their respective axles and twist (or rotate) around their fastenings in an axle at a right angle to the supporting area.

Figure 2:
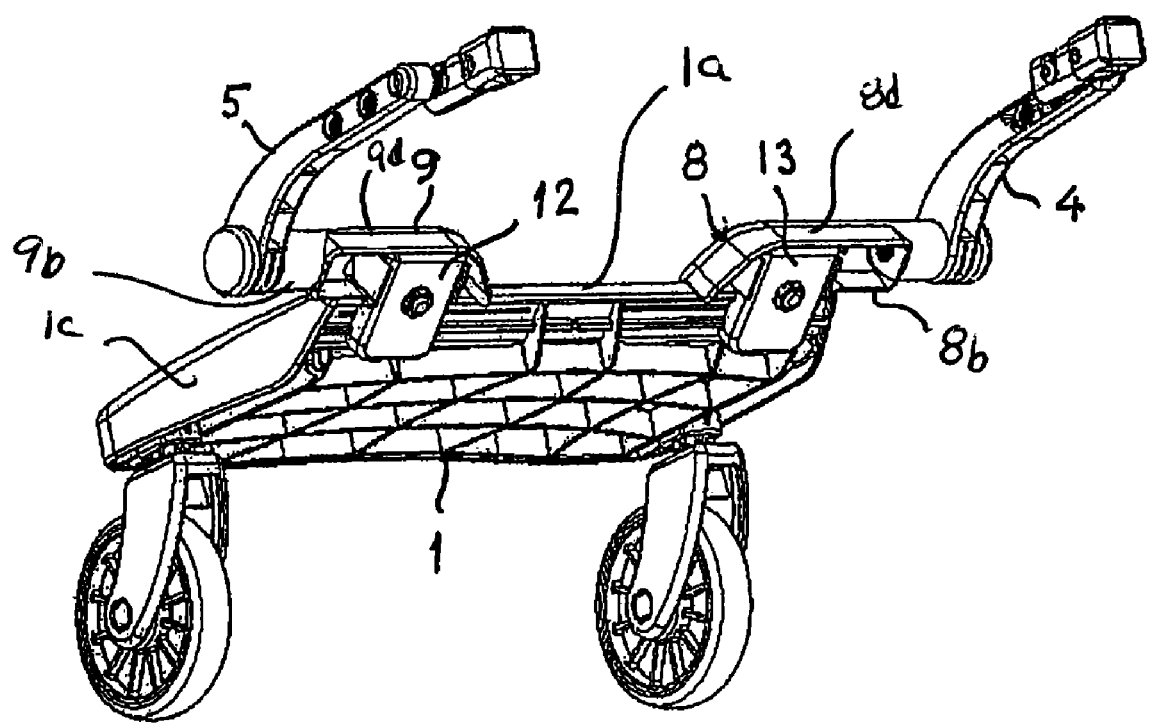
FIG. 2 shows a standing board in FIG. 1 seen at an angle from below.

In the front of the supporting area 14, the standing board 1 includes a forward or mounting area 15, which, as seen in the figures, is integral with the supporting area 14 and is positioned to be at an angle in relation to the supporting area 14. The front edge 1a of the standing board 1 is defined by, or at, the forward edge of the mounting area 15. Two guides 10, 11 are raised in relation to the otherwise level surface of the mounting area 15. As seen in FIG. 1, the two guides 10, 11 are generally parallel to each other and to the front edge 1a of the standing board, and define a track 16 on the mounting area 15. Mounts 8, 9 are connected to the mounting area 15 and together with the clamps 12 and 13 will grip a major portion of the mounting area 15. As seen from FIGS. 1 and 2, the mounts 8, 9 each include a mounting portion 8a, 9a and an extension 8b, 9b extending outwardly from the mounting portion in a direction generally parallel to the forward edge 1a of the standing board. As seen, the mounts 8, 9 are generally L-shaped in top plan view. The mounting portions 8a, 9a of the mounts 8, 9 each include an upper portion 8c, 9c which sits or rides upon upper surface of the mounting area 15 and extends across the track 16 and a forward portion 8d,9d which extends downwardly from the upper portion 8c, 9c and is adjacent the front edge 1a of the standing board 1. Thus, the mounting portions 8a, 9a of the mounts 8, 9 are generally L-shaped in side elevation. As seen best in FIG. 2, the clamps 12, 13 and the mounting portions 8a, 9a of the mounts 8, 9 sandwich or surround the forward edge 1a of the standing board.

The mounts 8, 9 are movable laterally along the mounting area 15 (i.e., along the front edge 1a of the standing board 1), as shown by the arrow 17; and, using the clamps 12, 13, the mounts 8, 9 can be moved to a desired position along the front edge 1a of the standing board 1 and can then be locked in that desired position such that the connecting arms will define a desired width between them to facilitate connecting the standing board 1 to the stroller.

Connecting arms 4, 5 are mounted at one end to the outer ends of the extensions 8c, 9c of the mounts 8, 9. As shown by the arrow 18 in FIG. 1, the connecting arms 4, 5 can be twisted or rotated about an axis which is generally parallel to the forward edge 1a of the standing board, to rotate in a generally vertical plane. At the outer end of the connecting arms 4, 5 there are connectors 6, 7 which are adapted to be connectable to a stroller to connect the standing board 1 to a stroller. The connectors 6, 7 can also be twisted for connection of the standing board to the stroller.

Hence, the connecting arms 4, 5 are movable generally horizontally along the front edge 1a of the standing board 1 (and along the mounting area 15) to selectively vary the distance between the connecting arms 4, 5 and are rotatable to selectively vary the angle of the arms 4, 5 relative to the standing board to facilitate connection of the connecting arms 4, 5 to a stroller. In addition, the connectors 6, 7 are pivotal or twistable relative to the connector arms 4, 5, and hence the connectors 6, 7 effectively have three degrees of freedom.

The invention claimed is:

1. A standing board attachable to a stroller;
   the standing board including a supporting area and a mounting area at a front of the supporting area, said mounting area being integral with the standing board supporting area and defining a front edge of said standing board; connecting arms mounted to and extending forwardly from said mounting area; said connecting arms having connectors adapted to connect the connecting arms, and hence said standing board, to the stroller; mounts attached to the mounting area of the standing board; said connecting arms being attached to the mounts to extend from the mounts; said mounts being movable along the front edge of the standing board to define a desired distance between the two connecting arms; said mounts comprising clamps to fix the mounts in their selected positions along the front edge of the standing board; said clamps being selectively switched between a locked mode in which the clamps tightly grip the front edge of the standing board to substantially prevent movement of said mounts along said standing board front edge and an unlocked mode in which the clamps do not tightly grip the front edge of the standing board to enable selective positioning of the mounts along the front edge of the standing board.

2. The standing board according to claim 1 wherein the connecting arms are rotatable relative to the standing board for setting the angle of the connecting arms relative to the supporting area of the standing board and wherein the connecting arms can be locked in a desired angular position relative to the standing board.

3. The standing board according to claim 1 wherein the mounting area is angled upwardly in relation to the supporting area.

4. The standing board according to claim 1 wherein the mounting area includes a generally level surface and one or more guides protruding from the generally level surface; said one or more guides being generally parallel to the forward edge of the standing board and defining a track along which said mounts move.

5. The standing board of claim 1 wherein said connectors are pivotal relative to the connecting arms.

6. The standing board of claim 1 wherein said mounts each comprise a mounting portion; the mounting portion comprising an upper portion and a forward portion extending downwardly from said upper portion, such that said mounting portion is generally L-shaped in side elevation; said upper portion riding on said mounting area of said standing board and said forward portion being adjacent said front edge of said standing board.

7. The standing board of claim 6 wherein said mounts each further include an extension extending outwardly from the mounting portion in a direction generally transverse to the direction of travel of the standing board; said connecting arms being attached to, and extending from, the extensions.

8. A standing board attachable to a stroller; the standing board comprising:
   a supporting area having a front edge, a back edge, side edges, an upper surface and a lower surface;
   a pair of mounts adapted to be movable along the front edge of the supporting area; the mounts comprising a mounting portion having an upper portion which overlies the upper surface of the standing board and a forward portion which extends downwardly from the upper portion and is adjacent the front edge of the standing board;
   a clamp operatively connected to the each mount, the clamp being positioned to engage the lower surface of the standing board, and operable to secure the mounts in desired locations along the front edge of the standing board; each said clamp being movable between a locked mode in which said clamp grips the forward edge of the standing board to substantially prevent movement of the mount along the forward edge, and an unlocked mode in which and the mount is movable along the forward edge; and
   a connecting arm extending from each mount; the connecting arm extending forwardly of the standing board in a direction generally perpendicular to the front edge of the standing board; the connecting arms each having a connector thereon operable to connect the connecting arm, and hence the standing board, to a stroller.

9. The standing board of claim 8, wherein said standing board comprises a mounting area integral with and at a front of the supporting area; said mounts being attached to said mounting area.

10. The standing board of claim 9 wherein said mounting area is angled upwardly relative to the supporting area.

11. The standing board of claim 9 wherein the mounting area includes a generally level surface and one or more guides protruding from the generally level surface; said one or more guides being generally parallel to the forward edge of the standing board and defining a track along which said mounts move.

12. The standing board of claim 8 wherein the mounting portion of the mounts are L-shaped in side elevation and comprise a first surface which engages an upper surface of said mounting area and a second surface which engages a forward surface of said mounting area.

13. The standing board of claim 8 wherein said mounts each further include an extension extending outwardly from the mounting portion in a direction generally transverse to the direction of travel of the standing board; said connecting arms extending forwardly from the extensions.

* * * * *